H. C. HARRISON.
ELECTRODE PROTECTOR.
APPLICATION FILED JUNE 7, 1909.
951,990.
Patented Mar. 15, 1910.
Fig. 1.
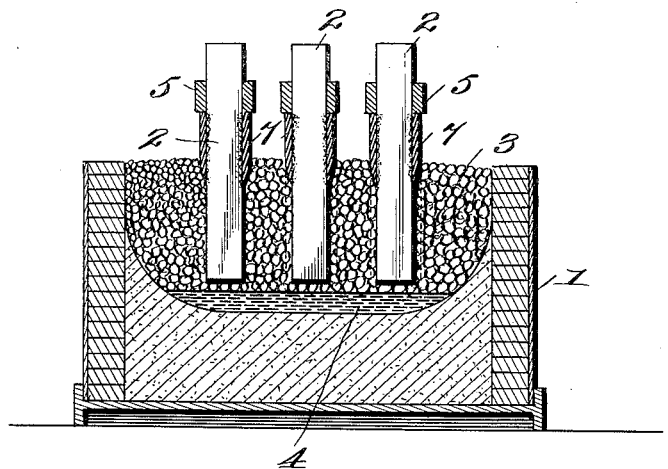
Fig. 2. Fig. 3. Fig. 4.
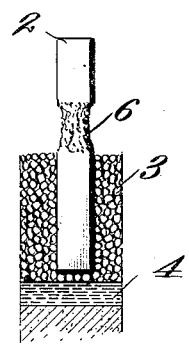  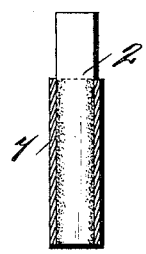
Witnesses
Geo. A. Byrne.
Jas. E. Dodge.
Inventor
H. C. Harrison Jr
Wilkinson Fisher &
Witherspoon
Attys.

UNITED STATES PATENT OFFICE.

HERBERT CHAMPION HARRISON, OF LOCKPORT, NEW YORK, ASSIGNOR TO ELECTRO METALLURGICAL COMPANY, A CORPORATION OF WEST VIRGINIA.

ELECTRODE-PROTECTOR.

951,990.  Specification of Letters Patent.  Patented Mar. 15, 1910.

Application filed June 7, 1909. Serial No. 500,528.

*To all whom it may concern:*

Be it known that I, HERBERT CHAMPION HARRISON, a subject of the King of Great Britain, residing at Lockport, county of Niagara, State of New York, have invented certain new and useful Improvements in Electrode-Protectors; and I do hereby declare the following to be a full, clear, and exact description of the invention, such as will enable others skilled in the art to which it appertains to make and use the same.

My invention relates to protectors by which electrodes such as are commonly used in electric smelting furnaces may be rendered less liable to burn and waste away, and by which the life of such electrodes is consequently considerably lengthened.

It is well known that carbon or graphite electrodes when used in an electric furnace will waste away when not completely immersed in the charge to be smelted, unless they are protected from the hot furnace gases, and the oxidizing effect of the surrounding air. Such waste results frequently in the electrodes being completely cut through at a point above the charge material when that portion of the electrode immersed in the charge material is still practically of the original full section, thereby causing great inconvenience and much waste. To remedy this defect, and wasting, many experiments have been tried, all of which are only partially successful; such as packing the electrodes in fine coke; surrounding them by a thin sheet of iron; packing them in asbestos material; wrapping them around with sheet iron; and painting the electrodes with tar, or a solution of water glass. All of these plans result possibly in some saving, but, at best, they are inefficient, as is well known to those familiar with the practical working of electric furnaces.

This invention consists in dipping the electrode in a bath containing some such material as common salt, or fluor spar, which has itself a comparatively low melting point and which when in use forms a compound which is inert at the temperatures to which it is to be subjected either as an oxidizing or as a reducing agent. If the electrode itself is made hot, and dipped into a molten bath of common salt, for example, kept well fluid considerably above its melting point, after a short interval the electrode may be withdrawn, and nearly all the superfluous salt will flow off leaving a glaze over the whole surface, which penetrates into the body of the electrode itself, a distance depending, among other things, on the porosity of the electrode, the length of the immersion, and the fluidity of the bath. In addition to molten baths I may use aqueous baths consisting of strong or saturated solutions of salts the oxids of whose metals form practically infusible slags, or coatings, at the temperatures to which they will be subjected above the charge. An example of a suitable salt for this purpose is, calcium chlorid, $CaCl_2$, which, after being heated in the air, forms, with the impurities present, a slag or coating consisting largely of $CaO$, and which will last as long as the electrode lasts. Other similar salts are very numerous and will readily occur to any chemist such for example as the chlorids of iron, copper, tin, etc. And by repeated dippings these solutions may be made to penetrate the pores of the electrode, as well as to form comparatively thick coatings on the outside.

Referring to the accompanying drawings forming a part of this specification, in which like numerals refer to like parts, in all the views:—Figure 1, is a diagrammatic sectional view of a furnace having electrodes, showing the thickness of their protective coatings, greatly exaggerated; Fig. 2, is a view showing the wasting that occurs on uncoated electrodes; Fig. 3, shows the electrode before dipping; and Fig. 4, shows the same electrode after dipping in a suitable protecting medium.

1 represents a furnace of any suitable type, 2 electrodes therefor, 3 the charge, 4 the products of the furnace and 5 any suitable lead to the electrode 2.

As illustrated in Fig. 2, when the furnace is working the electrode above the charge 3 usually wastes away, as indicated at 6. Sometimes this wasting is so much more rapid than is the consumption of the electrode beneath the surface of the charge, that the electrode is cut in two above the surface of the charge. To remedy this defect I may coat an electrode 2, as indicated in Fig. 3, with any suitable protecting coating 7, as by dipping said electrode in a molten bath of a suitable salt, such as sodium chlorid, or other salt, which will not readily volatilize or be consumed in the atmosphere immediately above the charge. The salt, when in a molten condition, readily enters the pores of the electrode, as indicated in Fig. 4, and thereby forms a firmly adhering protective coating for the electrode. And, since the salt that is chosen is of such a nature that it will not be readily acted upon by the gases above the charge, nor be readily volatilized by the heat to which it is exposed, the electrode is found to not waste away to any substantial extent, and its cross section above the charge to last as long as its body below the surface of the charge.

Of course, as stated above, instead of a molten bath, an aqueous solution of a water soluble compound which is practically non-volatile at the temperature above the charge may be employed, such as calcium chlorid or analogous salts. In both cases it is found that a glassy layer is formed over the electrode, and in the case of the calcium salts the calcium seems to combine with the other impurities present to form a practically non-volatilizable slag. In other words it is probable in both cases that the chlorin is more or less driven off, and practically infusible oxids of the metals combine with the impurities present to form slag-like coatings 7. Of course, at the high temperature beneath the surface of the charge the coatings 7 soon disappear, as indicated in Fig. 1, but the temperature above the charge not being so high, the said coatings remain intact.

An electrode treated as above, will not burn away at a high temperature even in a stream of oxygen, although the same electrode, untreated, under similar conditions, will burn brightly. Nor are the protective coatings thus formed found to be brittle when hot, and, as they do not volatilize easily at the temperatures employed, they are efficient. To obtain the thinnest coating possible it is best to have the carbon before withdrawing from the bath of the salt, hotter than the bath itself, but such practice is not necessary. The actual procedure can, of course, be varied in many ways without affecting the result.

It is evident, that those skilled in the art may employ a large number of salts suitable for my purpose, without departing from the spirit of the invention. For example, a very large number of metallic chlorids will to some extent form oxids when in use on an electrode, and will be found practically non-volatile at the temperatures employed, and, therefore, I do not wish to be limited to the salts mentioned except as may be required by the claims.

What I claim is:—

1. An electrode for a furnace, provided with a protective coating of a salt, which is substantially non-volatile and chemically inert to the gases above the charge of said furnace, substantially as described.

2. An electrode for a furnace, having a protective coating extending into its pores, and consisting of a substance which is substantially non-volatile in, and chemically inert to the atmosphere existing in said furnace, immediately above its charge, substantially as described.

3. An electrode for a furnace having a protective coating extending into its pores, and containing a salt of an alkali metal which is substantially non-volatile in, and chemically inert to the atmosphere existing in said furnace, immediately above its charge, substantially as described.

4. An electrode for a furnace having applied thereto a protective coating consisting essentially of sodium chlorid substantially as described.

In testimony whereof, I affix my signature, in presence of two witnesses.

HERBERT CHAMPION HARRISON.

Witnesses:
WM. KAUFMAN,
ROY H. ERNEST.